United States Patent [19]

Montalto et al.

[11] 4,307,430
[45] Dec. 22, 1981

[54] PROTECTOR DEVICE FOR TELECOMMUNICATIONS CIRCUITS

[75] Inventors: Anthony R. Montalto, Edison; Louis J. Scerbo, Succasunna; Jeremia P. Starace, Randolph Township, Morris County, all of N.J.

[73] Assignee: Bell Telephone Laboratories, Incorporated, Murray Hill, N.J.

[21] Appl. No.: 78,961

[22] Filed: Sep. 26, 1979

[51] Int. Cl.³ .............................................. H02H 9/06
[52] U.S. Cl. .................................. 361/124; 361/119; 337/32
[58] Field of Search ............... 361/124, 119, 118, 117, 361/120; 337/28, 29, 31, 32, 34

[56] References Cited

U.S. PATENT DOCUMENTS

| | | | |
|---|---|---|---|
| 3,255,330 | 6/1966 | MacKenzie et al. | 361/124 X |
| 3,573,695 | 4/1971 | Geyer et al. | 337/32 X |
| 3,818,271 | 6/1974 | Baumbach | 361/124 |
| 3,849,750 | 11/1974 | Baumbach | 337/32 |
| 4,004,192 | 1/1977 | Carney | 361/124 |
| 4,004,263 | 1/1977 | Carney | 361/124 X |
| 4,012,096 | 3/1977 | DeLuca et al. | 339/18 R |
| 4,057,692 | 11/1977 | DeBortoli et al. | 179/98 |
| 4,074,337 | 2/1978 | Debortoli et al. | 361/124 |
| 4,168,515 | 9/1979 | Baumbach | 361/124 |
| 4,179,170 | 12/1979 | Splitt et al. | 337/32 X |
| 4,215,381 | 7/1980 | Heisinger | 361/124 |

*Primary Examiner*—Patrick R. Salce
*Attorney, Agent, or Firm*—Robert O. Nimtz

[57] ABSTRACT

An electrical protector device (10) for grounding excessive voltage and excessive current to safeguard telecommunications circuits includes a heat coil assembly (100) for sensing and directing excessive current to ground, and a spark gap arrester (200), axially aligned with the heat coil assembly (100), for sensing and controlling excessive voltage. Whenever an overcurrent condition is encountered, heat coil mechanism (110) is displaced to provide metallic contact of the incoming line to a ground structure (300). In addition, the device is adapted to provide protected testing of both incoming pairs and office equipment. Two test points (123) formed as part of the heat coil assembly (100) are in contact with the individual wires of the incoming line. These two test points are accessible through apertures (402) in the protector housing (400).

5 Claims, 7 Drawing Figures

PROTECTOR DEVICE FOR TELECOMMUNICATIONS CIRCUITS

BACKGROUND OF THE INVENTION

1. Field of the Invention

This invention relates generally to electrical safety modules and, more particularly, to an electrical protector device which safeguards telecommunications circuits from excessive voltage and excessive current and, moreover, is adapted to provide electrical test accessing.

2. Description of the Prior Art

In modern telecommunication systems, protection apparatus safeguards personnel and equipment against overvoltage and overcurrent conditions. For example, in telephone central offices, the protection apparatus typically comprises a protector panel with protection devices inserted therein. The panel is usually located at the juncture between outside plant cable facilities and central office equipment and each protection device serves the two-fold purpose of electrically interconnecting the outside facilities to inside equipment and monitoring for abnormal electrical conditions at the juncture. In addition, the panel oftentimes incorporates a test point field so that electrical test access to outside facilities or inside equipment may be conveniently established.

The protector device normally utilizes series protection for excessive currents and shunt protection for excessive voltages. Series protection is usually effected by a pair of heat sensitive modules generally referred to as heat coils. Each coil is inserted in series with an incoming line and is responsive to undesired current which may damage facilities or equipment if allowed to persist. Excessive heat generated by the unwanted, persistent current flow on the line activates means for diverting the current through a path to ground.

Shunt protection is usually afforded by symmetrical pairs of axially aligned, ring-shaped carbon blocks which are arranged to define a so-called spark gap between them. One block from a pair is electrically grounded whereas the other is electrically connected to one wire of the incoming line. Excessive voltage caused by, for instance, lightning, is bypassed to ground by arcing within the spark gap.

U.S. Pat. No. 3,573,695, issued to J. B. Geyer et al on Apr. 6, 1971, is representative of prior art provisioning devices that combine carbon block and heat coil protection within a single module. The heat coil assembly includes a conductive pin which permanently contacts one wire of the incoming line. During excessive current flow, heat melts a solder joint holding the pin in place and allows a coil spring to drive the pin into contact with the grounded carbon block, thus diverting current through a resistive path to ground.

While devices of this type have provided generally satisfactory protection against overload conditions, they do exhibit shortcomings. One shortcoming is that intense, localized heat may be generated within the module after the pin completes the resistive path to ground. This heat may be sufficient to distort or even melt certain plastic elements in the device, thereby hampering protection effectiveness. A further disadvantage is that the pin reaches the grounded carbon block by penetrating a hole in the second carbon block. Particles may accumulate in the spark gap by dropping through the hole and result in shorting of the spark gap. Another shortcoming is that the heat coil assembly requires inordinate space within the limited volume of the module and, accordingly, additional features are precluded from incorporation within the device.

The protector modules disclosed in U.S. Pat. Nos. 4,004,192 and 4,004,263, both issued to W. V. Carney on Jan. 18, 1977, reduce excessive heat generation by diverting unwanted current through a totally metallic path to ground. In Carney '192, heat releases a coil spring which drives and then holds a conductive plunger in simultaneous contact with both the incoming line and a grounded metallic projection. In Carney '263, a coil spring drives an elongated, metallic bar protruding from the conductive plunger directly into contact with a flat ground plate. A compressible, conductive member insures electrical connectivity between the plunger and the incoming line irrespective of the plunger displacement.

In either of these designs, an aperture in one of the carbon blocks forming the spark gap guides axial motion of the plunger. Again, particle accumulation within the narrow spark gap may inhibit normal operation. In addition to this deficiency, the placement of the delicate heat coil external to the coil spring enhances the possibility of damage to the heat coil during assembly.

Another recent example of a protector design is disclosed in U.S. Pat. No. 4,057,692, issued to G. DeBortoli et al on Nov. 8, 1977. Although DeBortoli et al relate generally to protector panel apparatus, a protector device used in conjunction with the protector panel is also disclosed. This device is very similar to the previously mentioned designs, particularly with respect to the spark gap arrangement. In addition, in order to divert excessive current directly to ground, a coil spring drives a pin through an opening in a ring-shaped insulative member so as to contact ground. Particle accumulation within the opening in the ring member as well as within the spark gap represent shortcomings of this design.

The subject matter of U.S. Pat. No. 4,215,381, issued to R. F. Heisinger on July 29, 1980, and assigned to the same assignee as the present application, discloses a protector device that mitigates many of the shortcomings of the aforementioned devices. For example, the nongrounded carbon block no longer has an aperture, so problems caused by tiny particles accumulating within the spark gap are diminished. Also, the heat coil pin is stationary and remains directly in contact with both the nongrounded carbon block and the incoming line. This eliminates the need for additional internal space to permit pin movement. Furthermore, the heat coil assembly is within the helix of the coil spring. This arrangement virtually eliminates any potential damage to the delicate heat coil wire during assembly. Finally, the carbon blocks are enclosed in a metallic shield which permanently contacts a ground plate. This arrangement enhances heat dissipation by increasing the area of heated surfaces exposed to cooling effects. However, as elaborated upon later, an improvement in the device of the instant application provides for enhanced heat dissipation characteristics by enlarging the area of the ground assembly in permanent contact with the shield. This improvement mitigates regions of concentrated heat and virtually precludes distorting effects on plastic members, including the protector housing.

As alluded to earlier, access to a plurality of telephone pairs for testing is conventionally accomplished via a field of test points which are electrically bridged to the panel appearance of the pairs. This stand-alone test field appearance makes inefficient use of available space within a central office. The protector device disclosed herein eliminates the necessity of an independent appearance of the test field by providing internal test lands accessible with external probing means.

U.S. Pat. No. 4,012,096, issued to DeLuca et al on Mar. 15, 1977, is the closest art which relates to the instant application with respect to internal test lands. In DeLuca et al, a combined connector-test field panel is disclosed for effecting interconnection of outside plant cables to inside equipment. Both the incoming pairs and central office equipment appear side by side on pin couplets protruding from one face of the panel. Shorting plugs inserted on this face jumper adjacent couplets. It is suggested in DeLuca et al that the shorting plug housings may include apertures through which electrical probes may be inserted to check potentials directly at the connection point. A most severe limitation with this arrangement is the absence of protection. Moreover, protected testing is precluded. Furthermore, since the plug has no intermediate seating position, outside plant pairs may not be isolated from inside equipment and, accordingly, protected testing solely into the outside plant environment is impossible.

SUMMARY OF THE INVENTION

The foregoing shortcomings, limitations and deficiencies in prior art protector devices and test access arrangements are obviated with the present invention of an improved electrical protector device which incorporates, within a single enclosure, test access means as well as safeguards against excessive voltage and current.

The protector device in accordance with the present invention generally comprises the following three major interrelated and mutually dependent assemblies: (a) the heat coil assembly which provides the primary protection against overcurrent conditions and includes, as an integral part thereof, means for test accessing; (b) the spark gap arrestor which furnishes the primary protection against overvoltage conditions; and (c) the ground structure which serves as the main conducting path during overload conditions and also functions as a radiator to dissipate deleterious heating effects. Two other device members, namely, an insulative base and an external housing, cooperate with the major assemblies to form an encapsulated, compact module.

Broadly speaking, in the preferred embodiment of the present invention, the heat coil assembly comprises a heat coil mechanism which senses excessive currents and a conductive member which: aligns the heat coil mechanism with the spark gap arrester; has a projecting portion that serves as a test land; and electrically connects to one wire of the incoming outside plant pair. The spark gap arrester includes symmetrical pairs of carbon blocks enclosed in a metallic shield. The carbo blocks are solid and are arranged to define a spark gap between them. The ground structure includes a plurality of conductive plates which partially encompasses and is in direct contact with the metallic shield so as to provide efficient heat transfer and electrical conductivity between the shield and plates. One carbon block from each pair contacts the shield. A stationary, conductive bar associated with the heat coil mechanism electrically interconnects the nongrounded carbon block, the test land and the incoming line. Excessive heat causes displacement of a slidable portion of the heat coil mechanism along the bar. When movement is complete, a conductive flange on the heat coil mechanism shorts the incoming line to the ground structure. Excessive voltage is controlled by arcing within the spark gap. The external housing has apertures through which the test lands from a pair of heat coil mechanisms are accessible with external probing means. Guides and abutments internal to the housing align the shield, the ground plates and the projecting test lands so that the test lands bypass both the shield and plates and appear adjacent to the apertures. An insulative base couples to the housing and provides means for electrically joining the incoming pair, the equipment leads and ground to internal components of the module.

The protector device disclosed herein is part of newly devised protection provisioning apparatus which eliminates the independent appearance of the test field and, therefore, allows significant reduction in planar floor space requirements. Protection as well as test access are combined within a single protector module. Later, the more detailed discussion of an illustrative embodiment of the present invention describes a protector device having two test lands which individually contact the two incoming lines and which are accessible with probe means inserted through apertures in the protector housing. Central office apparatus which utilizes the instant protector device is the subject matter of U.S. Patent application Ser. No. 79,063, filed on even date herewith by P. R. Briggs, Jr. and L. J. Scerbo. Test accessing tools which provide either one-at-a-time or multiple access to the instant protector devices are disclosed in U.S. patent application Ser. No. 78,960, filed on even date herewith by A. R. Montalto, L. J. Scerbo and J. P. Starace. In addition, patent application Ser. No. 79,064, filed on even date herewith by R. M. Bulley, discloses an improved protector housing that mitigates shock hazards and which is, therefore, particularly well-suited for use with the device of the instant disclosure.

The features and advantages of the present invention will be apparent hereinafter from a detailed description of the invention and the appended claims taken in conjunction with the attached drawing of an illustrative embodiments.

BRIEF DESCRIPTION OF THE DRAWING

FIG. 7 is a perspective view of the insulative base.

DETAILED DESCRIPTION

Figure 1:
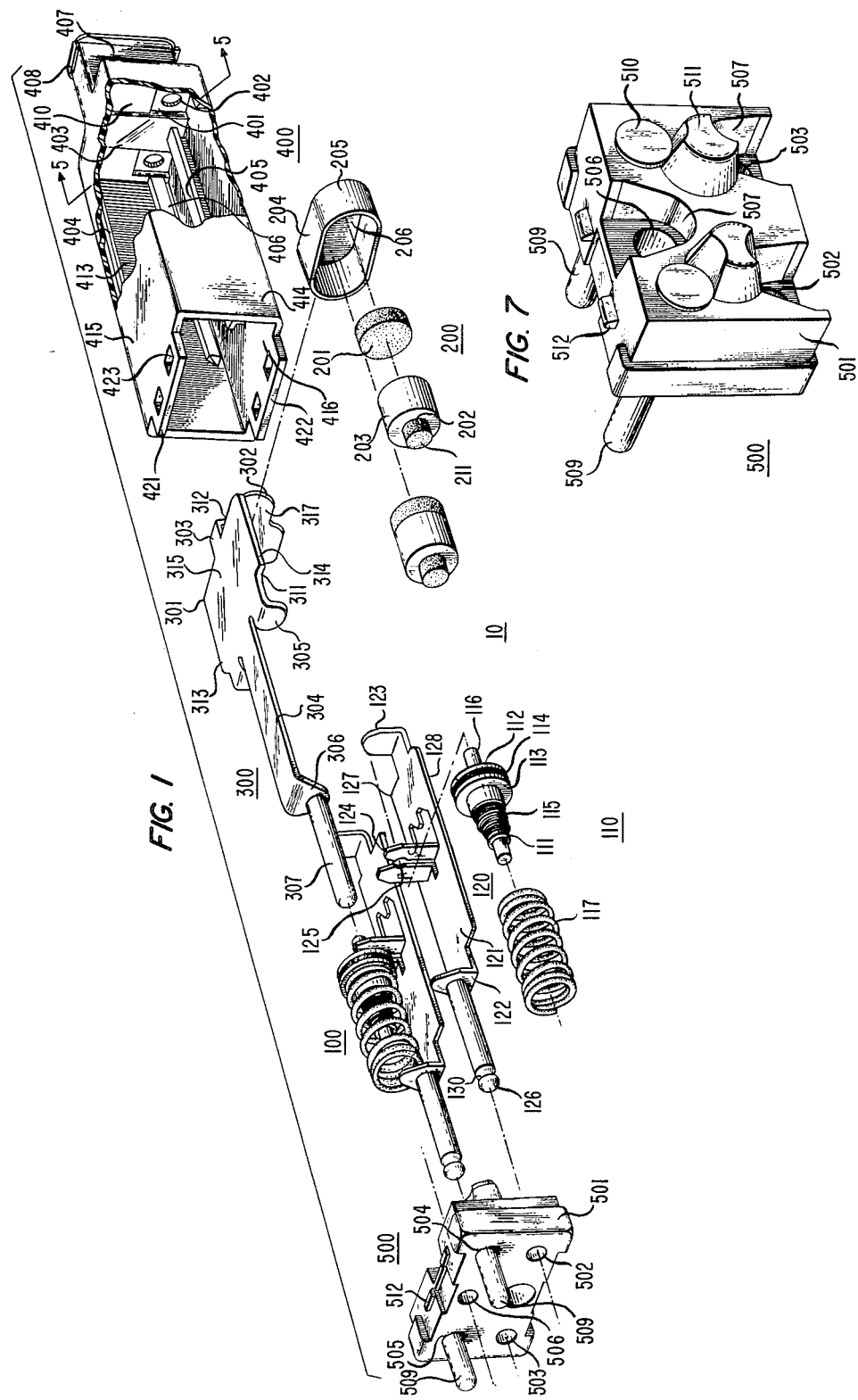
FIG. 1 is an exploded perspective view of the protector device.

The specific example of the protector device described herein by way of illustration is shown in exploded perspective view in FIG. 1. Protector device 10, which utilizes modular construction, is generally characterized by five component parts, namely: heat coil assembly 100; spark gap arrester 200; ground plate structure 300; protector housing 400; and insulative base 500. The detailed description is divided into three main categories. First, attention is focused on mechanical aspects of the structure. Then the electrical operation is explained and, lastly, thermodynamic properties are discussed. However, since these categories interact, some overlap in the exposition is needed for clarity.

1. Mechanical Construction

Heat coil assembly 100 is provided primarily for sensing any excessive current in the series connection between an incoming outside plate wire and a central office equipment lead (not shown). Two symmetrically arranged heat coil mechanisms 100 combine to furnish the necessary protection for both interconnections of an incoming wire pair with two central office leads.

With reference to FIG. 1, assembly 100 includes heat coil mechanism 110 and electrically conductive beam structure 120. Mechanism 110 comprises: spool 111 having conductive flange 112 formed integrally therewith at one end; conductive flange 113 mounted on the spool adjacent flange 112 but spaced-apart and electrically isolated from both spool 111 and flange 112 by insulator 114; windings 115 of resistance wire about the outer surface of spool 111 having one winding end connected to spool 111 and the other end connected to flange 113; bar 116 affixed to the inner surface of spool 111 by a thin coating of solder (not visibly apparent in FIG. 1); and coil spring 117 which drives spool 111 along bar 116 during overcurrent conditions which melt the solder coating.

Figure 2:
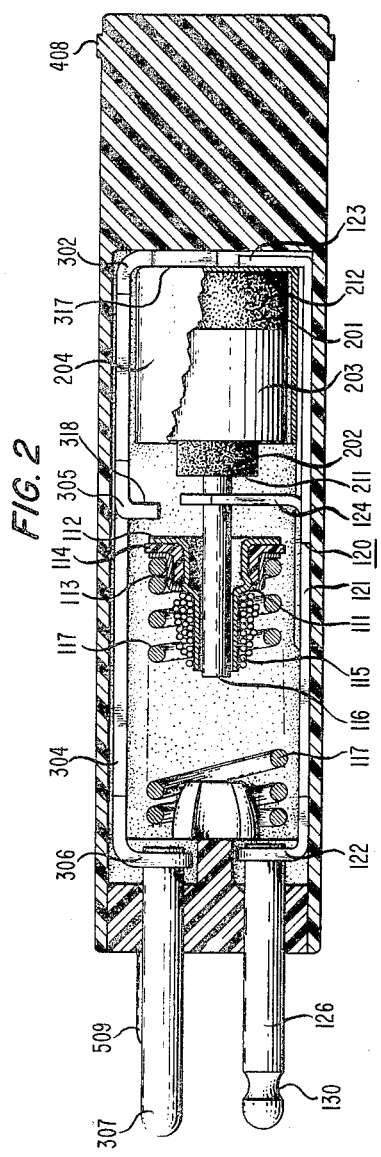
FIG. 2 is a sectional side view of an assembled protector device illustrating the beam support arrangement for holding the heat coil mechanism in position and the beam projection which forms the test land.
Figure 3:
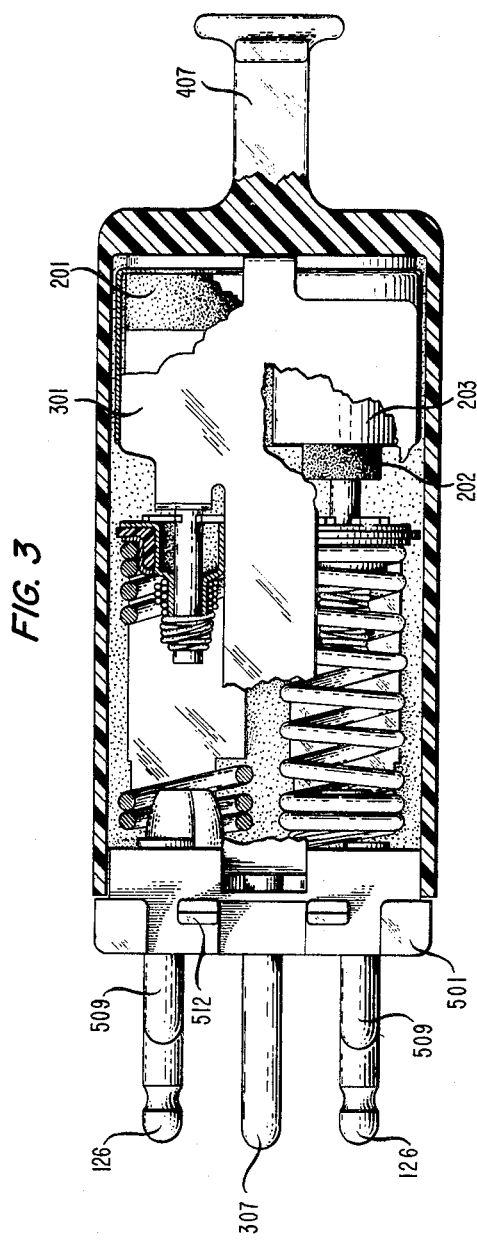
FIG. 3 is a sectional top view of an assembled protector device illustrating the placement of the heat coil within the spring helix and the location of the ground plates that partially encompass the metallic shield.
Figure 4:
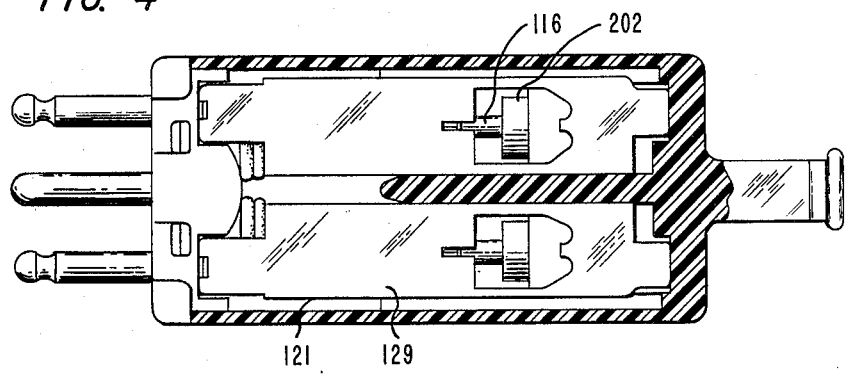
FIG. 4 is a bottom view of an assembled protector device illustrating the shape and placement of the beam connector and the associated projecting test land.

Heat coil mechanism 110 is held in axially aligned relation within the protector decive 10 with the aid of electrically conductive beam structure 120 (see FIG. 2). Beam 120 is comprised of elongated body 121 having inverted, generally U-shaped transverse projection 122 at one end and similarly shaped test land 123 at the other end. At an intermediate point along body 121, M-shaped slotted tab 124 is arranged perpendicular to body 121 and in the same transverse direction as members 122 and 123. Projections 122 and 123 are offset on the edges of body 121 so as to form left and right polarized beams 120, identical in all respects except for the different polarizations. Reversed assembly is thereby precluded. As contemplated in the illustrative embodiment, members 122, 123 and 124 are all formed through operations such as stamping and bending on body 121 which initially comprises a single piece of conductive material. The contour resulting from stamping tab 124 from body 121 is best depicted in FIG. 4. Bar 116 snaps into indented portions 125 of slotted tab 124. Affixed to U-shaped projection 122 is electrically conductive pin 126 which serves to connect device 10 to an incoming wire from a cable pair.

Excessive voltage on pin 126 is shunted to ground through a path normally including projection 122, body 121, tab 124, bar 116 and spark gap arrester 200. Arrester 200 is comprised of first and second carbon blocks 201 and 202, insulative holder 203 and shield 204. Insulative holder 203 positions carbon block 202 as that is axially aligned with and spaced apart from carbon block 201. The spacing is selected so that the gap between blocks 121 and 202 is approximately 3 mils.

Carbon blocks 201 and 202 are circular in cross section with block 201 having a diameter larger than the diameter of block 202. Furthermore, carbon block 201 has a thickness which is smaller than the thickness of carbon block 202. Insulative holder 203 is a partially hollow right circular cylinder of ceramic material having an outer diameter about the same as block 201. The diameter of the hollow as seen from the spark gap end of holder 203 is larger than the diameter as viewed from the other end. Carbon block 202 is pressed into the narrow hollow and adjusted so that the spark gap end is recessed within the broad hollow and the other end 211 projects beyond holder 203. The projecting end 211 permanently contacts bar 116 (see FIG. 2).

Encasing adjacent pairs of carbon blocks 201 and holders 203 is conductive, elliptically-shaped shield 204 having sleeve portion 205 and flat end 206 formed integrally therewith. Carbon block 201 rests on flat end 206 to form a conductive path therebetween.

The ground plate structure 300 comprises: conductive, generally rectangular-shaped top plate 301 having edges 311, 312, 313 and 314 and top face 315 with edges 311 and 312 lying along the longer dimensional side of the rectangle; inverted, generally T-shaped conductive side plate 302 disposed transversely with respect to top plate 301 via bend 303 which extends from the center of edge 312; generally elongated conductive rib 304 emanating laterally from the center of edge 311; two transversely directed solid tabs 305 projecting from edge 311 and separated by rib 304; and inverted, generally U-shaped nub 306 projecting transversely from the free end of rib 304. As contemplated in this illustrative embodiment, members 301 through 306 are formed through operations such as stamping and bending from a unitary piece of conductive material. Members 302, 305 and 306 lie in generally parallel planes which are substantially perpendicular to the plane containing plate 301 and rib 304.

Rib 304 is approximately one-third the width of plate 301 as measured between edges 313 and 314. As best seen in FIG. 2, the distance between the inner surface 318 of tab 305 and the inner face 317 of plate 302 is larger than the overall dimension of the spark gap arrester 200 as measured from the projecting end 211 of block 202 and the back surface 212 of shield 204. Since back shield surface 212 and inner face 317 are in direct contact, tab 305 projects beyond end 211.

Affixed to V-shaped nub 306 is electrically conductive pin 307 which serves to connect device 10 to an external ground.

With reference again to FIG. 1, enclosing heat coil assembly 100, spark gap arrester 200 and ground plate structure 300 is generally rectangular-shaped protector housing 400. Internal to the side and back walls of housing 400 are various alignment means formed as integral parts of housing 400. Two generally square-shaped, symmetrically located recesses 401 are provided in the bottom portion of back wall 410. Apertures 402, centrally located in recesses 401, provide means for accessing test lands 123 positioned in recesses 401 using external probing means (not shown).

Raised, rectangular-shaped abutment 403 extends from the top to bottom of back wall 410 between recesses 401. The back surface (not visible in FIG. 1) of T-shaped plate 302 rests on abutment 403. The arrangement of abutment 403 and recesses 401 precludes contact between test lands 123 and side plate 302 along back wall 410.

Guides 404, oriented in front-to-back relation internal to the upper portions of walls 413 and 414 from about their midpoint, receive edges 313 and 314 of top plate 301 and hold top face 315 against the inner surface of top wall 415. The width of plate 301 as measured between edges 313 and 314 is less than the distance between the inner surfaces of side walls 413 and 414 so as to maintain housing 400 and ground plate structure 300 in slidable relation.

Track 405 runs in front-to-back relation along the inner surface of bottom wall 416 from approximately its midpoint. Rails 406 are oriented in front-to-back relation internal to the bottom portions of walls 413 and 414 from about their midpoints. Track 405 and rails 406 receive edges 127 and 128, respectively, of body 121, and hold bottom surface 129 (see FIG. 4) against the inner surface of wall 416.

Metallic shield 204 rests on top of track 405 and precludes any contact between body 121 and shield 204. Guides 404 and rails 406 have dimensions appropriate to align elliptically-shaped shield 204 between them and thereby minimize the points of contact of shield 204 to the plastic walls of the housing.

Figure 5:
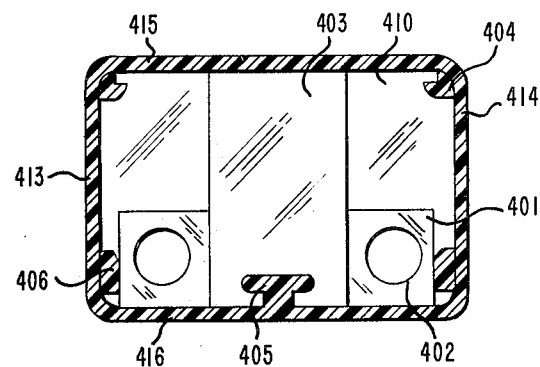
FIG. 5 is a cross-sectional view of the protector housing as viewed in the direction of line 5—5 in FIG. 1.

FIG. 5 depicts the alignment means internal to housing 400 as viewed in cross section along the direction line 5—5 in FIG. 1. Recesses 402 are designed to accept the polarized beams 120 as well as nonpolarized beams (not shown) used in a "dummy" protector that serves as an extension of the cable pairs.

Formed integrally with back wall 410 is grip 407 which facilitates handling of protector device 10. Grip 407 also aids in aligning a field of protector devices 10 arranged side by side in a protector panel for access by multiple-access probing means (not shown). Projecting from the two narrow faces of grip 407 are separators 408 which abut separators from adjacent devices to form an evenly spaced field. In addition, grip 407 serves as a memmber which may easily be grasped to support single-access probing means.

Figure 6:
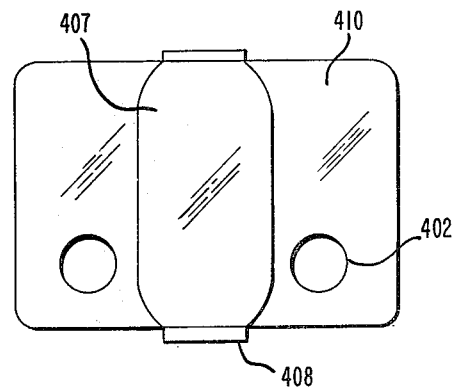
FIG. 6 is an end view of the assembled protector illustrating the apertures used to access the test lands.

FIG. 6 depicts protector device 10 as viewed from the grip end of housing 400.

Insulative base 500 is shown in FIGS. 1 and 7. With reference to FIG. 7, base 500 includes rectangular block 501 which has spaced-apart line apertures 502 and 503 and similarly spaced equipment apertures 504 and 505 (see FIG. 1) located proximate to the four corners of block 501. An additional aperture 506 is between apertures 504 and 505. Surrounding apertures 502, 503 and 506 are inverted, generally U-shaped indentations 507. U-shaped projection 122 fits into indentation 507 surrounding either aperture 502 or 503 to form a polarized union therein. Similarly, nub 306 fits in a polarized fashion into indentation 507 surrounding aperture 506.

Conductive pins 509 have flat ends 510 that are larger than the diameter of pin 509. Pins 509, which are pressed into apertures 504, serve to connect protector device 10 with two equipment leads (not shown). Extending outwardly from the inner face of block 501 are a pair of truncated, cone-like projections 511. Coil spring 117 is held in axial alignment within protector device 10 by straddling projections 511 on one end and heat coil mechanism 110 on the opposite end.

On opposite faces of housing 400 and extending outwardly therefrom are first and second projections 421 and 422, each of which has a pair of spaced-apart apertures 423 therein. When housing 400 is engaged with base 500, projections 421 and 422 are grasped by triangular-shaped barbs 512 on block 501, thereby forming a securely encapsulated and internally aligned module.

2. Electrical Operation

During normal operating conditions, current from an incoming line circuit (not shown) is coupled through pin 126, projection 122, body 121 and slotted tab 124 to bar 116 of heat coil mechanism 110. The current then passes through resistance winding 115 to flange 113 and continues through spring 117 to flat end 510 and finally to pin 509, which passes the current to office equipment leads. The electrical contact between bar 116 and slotted tab 124 is mechanical in nature, as contrasted to an electrical joint achieved, for example, by soldering. Good contact is assured by force fitting bar 116 into tab indents 125. Similarly, electrical contact of each end of spring 117 to either flat end 510 or flange 113 is through mechanical joining. Good contact between metal parts is assured by holding spring 117 in compression during all phases of operation.

Initially, during excessive current flow, resistance wire winding 115 heats spool 111 and causes the thin coating of solder to melt. Heat coil mechanism 110 is now free to slide along bar 116 towards tab 124. Coil spring 117 drives heat coil mechanism 110 along bar 116. Ultimately, flange 112 engages one of the solid tabs 305 on ground plate structure 300 and movement ceases. The current is now diverted from resistance windings 115 and flows directly to ground via spool 111, flange 112, solid tabs 305, rib 304, U-shaped nub 306 and pin 307.

With respect to excessive voltages, the circuit path is identical to that followed by the current up to bar 116. At this point, voltage is coupled from bar 116 to carbon block 202 via the direct electrical contact between them. The path is completed by arcing in the gap between carbon blocks 202 and 201, the latter block being in intimate contact with shield 204 which is effectively at ground potential. Ground is coupled to shield 204 through pin 307, rib 304, top plate 301, bend 303 and side plate 302. Both top plate 301 and side plate 302 partially surround and contact shield 204.

If excessive voltage occurs subseqent to an excessive current condition, bar 116 is already grounded and spark gap protection is obviated.

Since test land 123 is an integral part of each body member 121, direct electrical access to incoming outside plant pairs is established with probing means inserted through apertures 402 in housing 400. Thus, protected testing to fully in-service pairs is faciliated.

Protected testing directly into the outside plant environment is also contemplated by the illustrative embodiment. Outside plant pins 126 and ground pin 307 are designed to be longer than equipment pins 509 so as to provide an intermediate seating position within panel apparatus (not shown). In this so-called detent position, the connection to office equipment leads is broken, but the connection to the outside plant pair and ground is maintained. Ridges 130 on pin 126 facilitate indent positioning to correspondingly mated protector panel apparatus.

3. Thermodynamic Properties

To mitigate distorting or buckling effects on certain members of device 10, particularly housing 400, top plate 301 and side plate 302 partially surround and provide a thermal path to shield 204. This arrangement minimizes regions of concentrated heat by providing large metallic area for dissipation.

In addition, guides 404, track 405 and rails 406 position shield 204 within housing 400 so as to minimize direct physical contact of shield 204 with the walls of housing 400. In addition, guides 404, track 405 and rails 406 provide reenforcement against undue stress. Similarly, abutment 403 furnishes reenforcement along back wall 410. Finally, top plate 301, being wedged between guides 404, furnishes suppport to counteract twisting and buckling forces.

In all cases it is to be understood that the above-described embodiment is illustrative of many possible specific embodiments which can represent application of the principles of the invention. The embodiments may assume other forms, materials or dimensions limited only by the scope of the appended claims.

We claim:

1. An electrical device located at the interface between an incoming wire pair and an outgoing wire pair for diverting to a ground structure excessive current and voltage and arranged to provide two electrical test points, one of said test points bridging one of said incoming wires and the other of said test points bridging the complementary wire of said pair, comprising in combination:

an adjacent pair of heat coil assemblies inserted in series between said incoming and outgoing pairs, each of said assemblies comprising
  a heat coil mechanism movable from a first position spaced-apart from said ground structure to a second position proximate to said ground structure in response to heat generated by said excessive current including: a spool having a first conductive flange at one end; a second conductive flange mounted on said spool and being electrically isolated from said spool and said first flange; windings of resistance wire about the outer surface of said spool with one wire end connected to said second flange and the other end to said spool; a conductive rod affixed to the inner surface of said flange by a thin coating of solder; and an electrically conductive coil spring having one end contacting one of said outgoing wires and the other end contacting said second flange for pushing said second flange from said first to said second position along said bar whenever heat melts said solder so as to bring said first flange into contact with said ground structure to divert said excessive current to ground, said spring axially aligned with said spool and containing said spool and said windings within the helix of said spring;
  an elongated, electrically conductive body having a transverse bend at one end providing a projection, a tab transverse to said body at an intermediate point along its length for supporting said rod, and a transverse bend at the other end providing a test land to serve as one of said test points, wherein said projection, said tab, and said land are disposed in the same transverse direction; and an electrically conductive pin affixed to said projection for connecting one of said incoming pairs to said device;

an adjacent pair of spark gap arresters, axially aligned with said pair of heat coil assemblies, each of said arresters electrically in shunt with one of said incoming wires and comprising
  a first carbon block; a second carbon block contacting said bar; and an insulated holder, axially aligned and abutting said first carbon block and partially surrounding said second carbon block for holding said second block in a predetermined, spaced-apart relation to said first block,
  a conductive shield encasing adjacent pairs of said first and second carbon blocks except for the free faces of said second blocks, said shield having an end face having one surface contacting the free faces of said first carbon blocks and the other surface contacting said ground structure and a sleeve portion encompassing said holders and said first blocks;

said ground structure comprising
  a conductive top plate contacting a substantial portion of said sleeve on one of its outer surfaces; a side plate disposed transversely to and joined with said top plate for contacting the outer surface of said end face; and a member emanating from said top plate for contacting external ground; and a generally rectangular-shaped housing having a pair of apertures in the back wall, each of said apertures aligned for accessing said test land, and means affixed to said back wall for facilitating accessing and handling of said device.

2. The device in accordance with claim 1 wherein said housing has a pair of side walls, a top wall and a bottom wall further comprises:
  a pair of guides, each of said guides formed integrally with and proximate to the top edge of each of said side walls, for retaining said top plate parallel to said top wall;
  a pair of rails, each of said rails formed integrally with and proximate to the bottom edge of each of said side walls;
  a track formed parallel to said side walls and centered on the inner surface of said bottom wall, for offsetting said shield from said body member and wherein said track and one of said rails cooperate to retain said body member parallel to said bottom wall;
  an abutment formed vertically between said apertures on the inner surface of said back wall to offset said side plate from said back wall; and
  a pair of recesses surrounding said apertures, each of said recesses arranged to seat said test land, and wherein said abutment and said recesses cooperate to maintain a spaced-apart relation between said side plate and each said test land.

3. The device in accordance with claim 2 wherein said housing further includes first and second projections integral with said top and bottom walls and extending laterally therefrom, each of said projections having a pair of spaced-apart apertures therein, and said device further comprises an insulative base including
  a generally rectangular-shaped block having first and second pairs of spaced-apart apertures and an additional aperture intermediate said first and second aperture pairs, each of said first pair of apertures emitting said pin of said heat coil assembly to connect to said incoming pair, said intermediate aperture emitting said emanating member of said ground structure, said second pair of apertures each fit with a conductive pin contacting said coil spring on one end and one of said outgoing wires on the other end, and first and second spaced-apart triangular-shaped barbs on oppositely disposed edges of said block for engaging said apertures in said first and second projections on said housing to hold said housing to said insulative base.

4. An electrical device inserted in a line to protect against excessive current and voltage, said device having input and output terminals arranged in pairs and being adapted to provide, for each of said pairs, an electrical test land for accessing one of said terminals from each of said pairs, said device comprising in combination:

a ground structure;

a heat coil assembly for sensing said excessive current in said line and for diverting said excessive current to said ground structure; and means for conducting said excessive voltage from said line to said ground structure characterized in that said heat coil assembly further includes a conductive member communicating with one of said terminals from each of said pairs and having a surface arranged to furnish said test land; and said ground structure comprises a conductive top plate and conductive side plate both having essentially the same widths, said side plate being disposed transversely to and joined with said top plate, and the inner surfaces of said top plate and said side plate electrically contacting said means for conducting.

5. The device in accordance with claim 4 further including a generally rectangularly-shaped housing having apertures in the back wall, each of said apertures aligned for accessing each said test land, said housing also comprising:

a pair of guides, each of said guides formed integrally with and proximate to the top edge of each of said side walls, for retaining said top plate parallel to said top wall;

a pair of rails, each of said rails formed integrally with and proximate to the bottom edge of each of said side walls;

a track, formed parallel to said side walls and centered on the inner surface of said bottom wall, for offsetting said means for conducting from each said conducting member and wherein said track and one of said rails cooperate to retain each said member parallel to said bottom wall;

an abutment formed vertically between said apertures on the inner surface of said back wall to offset said side plate from said back wall; and recesses surrounding said apertures, each of said recesses arranged to seat each said test land, and wherein said abutment and said recesses cooperate to maintain a spaced-apart relation between said side plate and each said test land.

* * * * *

UNITED STATES PATENT AND TRADEMARK OFFICE
CERTIFICATE OF CORRECTION

PATENT NO. : 4,307,430

DATED : December 22, 1981

INVENTOR(S) : Anthony R. Montalto, Louis J. Scerbo, and Jeremia P. Starace

It is certified that error appears in the above—identified patent and that said Letters Patent is hereby corrected as shown below:

Column 3, line 2, "appearance" should read --appearances--; line 58, "carbo" should read --carbon--.

Column 5, line 41, "decive" should read -- device-- line 68, "as" should read --so--. Column 6, line 3, "121" should read --201--. Column 7, line 41, "memmber" should read --member--. Column 8, line 45, "subseqent" should read --subsequent--. Column 9, line 11, "suppport" should read --support--.

Signed and Sealed this

Twenty-fifth Day of May 1982

[SEAL]

Attest:

Attesting Officer

GERALD J. MOSSINGHOFF

Commissioner of Patents and Trademarks